United States Patent
Bigelow

(10) Patent No.: US 7,127,308 B2
(45) Date of Patent: Oct. 24, 2006

(54) PRODUCT DESIGN SYSTEM AND METHOD

(75) Inventor: David H. Bigelow, Greenwood, IN (US)

(73) Assignee: Simplified Logic, Inc., Indianapolis, IN (US)

( * ) Notice: Subject to any disclaimer, the term of this patent is extended or adjusted under 35 U.S.C. 154(b) by 0 days.

(21) Appl. No.: 11/182,347

(22) Filed: Jul. 15, 2005

(65) Prior Publication Data

US 2005/0251274 A1  Nov. 10, 2005

Related U.S. Application Data

(63) Continuation of application No. 10/696,087, filed on Oct. 29, 2003, now abandoned, which is a continuation of application No. 09/596,461, filed on Jun. 19, 2000, now Pat. No. 6,647,305.

(51) Int. Cl.
G06F 19/00 (2006.01)

(52) U.S. Cl. .................. 700/97; 700/103; 700/182; 703/1; 715/964

(58) Field of Classification Search .................. 700/97, 700/103, 104, 105, 182; 703/1; 715/964
See application file for complete search history.

(56) References Cited

U.S. PATENT DOCUMENTS

| | | | |
|---|---|---|---|
| 5,019,961 A * | 5/1991 | Addesso et al. ............... 700/87 |
| 5,355,317 A * | 10/1994 | Talbott et al. ................ 700/97 |
| 5,552,995 A | 9/1996 | Sebastian |
| 5,708,764 A * | 1/1998 | Borrel et al. ................ 345/419 |
| 5,732,264 A | 3/1998 | Tanaka |
| 5,815,154 A * | 9/1998 | Hirschtick et al. .......... 715/853 |
| 5,815,683 A | 9/1998 | Vogler |
| 5,822,207 A | 10/1998 | Hazama et al. |
| 5,856,925 A * | 1/1999 | Maeda et al. ................... 716/5 |
| 5,966,310 A | 10/1999 | Maeda et al. |
| 6,249,714 B1 | 6/2001 | Hocaoglu et al. |
| 6,295,513 B1 | 9/2001 | Thackston |
| 6,343,285 B1 | 1/2002 | Tanaka et al. |
| 6,343,302 B1 | 1/2002 | Graham |
| 6,397,117 B1 | 5/2002 | Burrows et al. |
| 6,489,980 B1 | 12/2002 | Scott et al. |
| 6,611,725 B1 * | 8/2003 | Harrison et al. .............. 700/98 |
| 6,725,112 B1 | 4/2004 | Kaminsky et al. |
| 6,748,346 B1 | 6/2004 | Ujiie |
| 6,847,853 B1 | 1/2005 | Vinciarelli et al. |

(Continued)

OTHER PUBLICATIONS

Apple Computer, Inc., Inside Webobjects Overview, Dec. 2000.

(Continued)

*Primary Examiner*—Leo Picard
*Assistant Examiner*—Alexander Kosowski
(74) *Attorney, Agent, or Firm*—Bose McKinney & Evans LLP

(57) ABSTRACT

A method of implementing an administration system for use with a computer aided design (CAD) system. The method includes generating multiple CAD objects using the CAD system, and generating multiple web objects. A set of object properties is defined for each of the CAD objects; and for each of the web objects. A plurality of links are created, with each link defining a conditional relationship between a parent object and a child object. Each parent object is one of the CAD objects or one of the web objects, and each child object is one of the CAD objects or one of the web objects. A set of link relationships is defined for each of the links.

11 Claims, 14 Drawing Sheets

U.S. PATENT DOCUMENTS

| | | |
|---|---|---|
| 6,912,487 B1 | 6/2005 | Garcia et al. |
| 2001/0047251 A1 | 11/2001 | Kemp |
| 2002/0012007 A1 | 1/2002 | Twigg |
| 2004/0236540 A1 | 11/2004 | Tsuji et al. |
| 2005/0172260 A1 | 8/2005 | Eichstaedt et al. |

OTHER PUBLICATIONS

Bowstreet, This is Bowstreet, http://www.bowstreet.com, Feb. 7, 2001.

Chan, Spiller, The Design of an Internet-Based Collaborative System Architecture; http://www.cad.eecs.berkeley.edu; Computer Science 269, Spring 1996.

Parametric Technology Corporation, Parametric Technology Corporation Introduces Solutions to Enable Collaborative Product Commerce, Oct. 26, 1999.

Regli, William C., Internet-Enabled Computer-Aided Design, National Standards and Technology, IEEE Internet Computing, vol. 1, No. 1, Jan.-Feb. 1997.

Parametric Technology Corporation, Parametric Technology Corporation Announces Windchill Release 3.0 with New Enterprise Product Modeling (EPM) Solutions, Jul. 26, 1999.

Parametric Technology Corporation, Parametric Technology Received Recent Orders for Windchill Software and Services from the UK Ministry of Defence, Jun. 8, 1999.

Parametric Technology Corporation, Parametric Technology Corp. Industry Partners See Significant Opportunities for Windchill Release 2.0, Jan. 12, 1999.

Systems and Consulting, LLC, LOGIA Configurator, Configuration, 1996-2000.

Parametric Technology Corporation, Parametric Technology Corporation Assounces the Windchill FACTOR! e-series, Oct. 26, 1999.

Parametric Technology Corporation, Parametric Technology Corporation Announces the Windchill(TM) Enterprise Product Information Management Family, Apr. 8, 1998.

Parametric Technology Corporation, Parametric Technology Corporation Announces Pro/Engine (TM) Advanced Technology for Process Knowledge Capture and Reuse, Jun. 7, 1997.

Parametric Technology Corporation, Windchill Product Planning FACTOR! Datasheet, 1999.

Aberdeen Group, Collaborative Product Commerce: Delivering Product Innovations at Internet Speed, vol. 12, No. 9, Oct. 7, 1999.

Aberdeen Group, Profile, 2000.

Rand Worldwide, Automation Gateway, 1999.

Parametric Technology Corporation, InPart: Demo and Example Screens, 1999.

Parametric Technology Corporation, Windchill Executive White Paper—Leveraging the Internet for Collaborative Product Commerce, date unknown.

Parametric Technology Corporation, Windchill Sourcing FACTOR! White Paper—Leveraging the Internet for Part and Supplier Standardization, date unknown.

Workgroup Technology Corporation, Customize Web Interfaces to Increase Access to Product Information, 1998.

Workgroup Technology Corporation, File Management & Enterprise—Wide Product Data Management (PDM) for Pro/ENGINEER Users, 2000.

Workgroup Technology Corporation, Collaborative Product Data Management for the Extended Enterprise, 2000.

Heide Corporation, White Paper—Product Configuration Solutions: Comparison of Parametric CAD and Rule Based Technology, Feb. 13, 1998 (revised Feb. 12, 1999).

Heide Corporation, Major Auto Manufacturer Consolidates and Controls Analytic Tools with Intent (TM), date unknown.

Heide Corporation, Marley Cooling Tower, date unknown.

Heide Corporation, Van Zelmn Heywood & Shadford Automates, Speeds Multi-Faceted Building Systems Design with Intent!-Based Design System, date unknown.

Computer-Aided Engineering, Automated Design and Sales, Oct. 1998.

Heide Corporation, Lead Time Reduction Keeps Food Service Equipment Company Out of the Soup, date unknown.

Heide Corporation, Wheelmaker Keeps Auto Companies Rolling with Optimized Wheel Designs, date unknown.

Design News, Battery Maker Charged Up About Software Design Tool, Sep. 7, 1998.

Heide Corporation, Knowledge Based Automation and Systems Integration, date unknown.

Heide Corporation, the Architecture of Intent!, date unknown.

Heide Corporation, Understanding Intent!, date unknown.

Heide Corporation, Intent!—Knowledge-Based Engineering Software From Heide Corporation, 1997.

Letter from Heide Corporation VP of Sales to David Bigelow, Apr. 16, 2000.

Bentley Systems, Inc., Model Server Publisher, 1995-1998.

Bentley Systems, Inc., Model Server Publisher Technical Information, 1995-1998.

aCATec, Power/Auto Assemble for Pro/Engineer, May 31, 1999.

Zilles, Tony, CAD on the Web, 1997.

J.D.Edwards, Making Custom Jobs Works, Jan. 20, 2000.

Computer Graphics World, Engineering on the Internet, Aug. 1996.

Inventure Technologies, Inc., White Paper—Enterprise Data Browsin—Data and Analytics in the Internet Age, 1995-2000.

Configuration Systems & Consulting, LLC, e-Logia Web Enabled Configurator, 1996-2000.

Configuration Systems & Consulting, LLC, Order Entry Solution—Expanded, 1996-2000.

Configuration Systems & Consulting, LLC, Order Entry Solution, 1996-2000.

Configuration Systems & Consulting, LLC, Logia Configurator Enterprise Integration, 1996-2000.

Configuration Systems & Consulting, LLC, Engineering Solution, 1996-2000.

Configuration Systems & Consulting, LLC, Engineering Solution—Expanded, 1996-2000.

* cited by examiner

1502

1504

| Question | Answers |
|---|---|
| What type of thread on bolt? | Fully threaded ▽ ← 1604 |
| Length of bolt? | ⊙ 22 mm   ○ 25 mm |
| What type of material for fan? | ○ Hardened steel<br>○ Stainless steel |
| Customer ID? | [ ] |

Post Processing Options

☐ Print   ☐ Display   ☐ Save   ☐ Email   [ ]

[Submit]   [Reset Form]

PRODUCT DESIGN SYSTEM AND METHOD

CROSS REFERENCE

The application is a continuation of U.S. application Ser. No. 10/696,087, filed Oct. 29, 2003, now abandoned which is a continuation of application Ser. No. 09/596,461, filed Jun. 19, 2000, now U.S. Pat. No. 6,647,305, the disclosures of which are incorporated herein.

BACKGROUND OF THE INVENTION

The present invention relates to product design systems, and more specifically, but not exclusively, relates to a product design system that allows for product design over a network.

Computer Aided Design (CAD) systems are all used in a wide variety of areas such as engineering product design, and development. Although CAD and Computer Aided Manufacturing (CAM) systems have reduced the amount of work required in product development and manufacturing, CAD/CAM systems, due to their complexity and cost, have created obstacles to rapid product development within companies. CAD/CAM systems in most companies are only used in isolated engineering/drafting departments. Even simple product designs require the assistance of the engineering/drafting department, because only the draftspersons and engineers within the department have the expertise to operate in complex CAD/CAM systems. The resources of an engineering/drafting department can be limited, and this in turn limits access to the CAD/CAM systems. This limited access can create a bottleneck in the product development cycle. Further adding complication to the design process is the increased popularity of the internet. The internet has increased the pressure on organizations to reduce product development time. Further, the internet has increased the demand for personalized product design.

Thus, needs remain for further contributions in this area of technology.

SUMMARY OF THE INVENTION

One form of the present invention includes a method of designing products. The method includes operating an administration system separate from an associated computer added design system. The administration system is configured to facilitate creation of relationships between object properties for a number of different object design components from within and external to the computer aided design system. The administration system has an output device. The method further includes receiving a first input corresponding to a selection of a first object design, retrieving the object properties and values of the object properties for the first object design from the computer aided design system, and displaying the first object design on the output device. The method further includes receiving a second input corresponding to a selection of a second object design for interaction with the first object design, retrieving the object properties and values of the object properties for the second object design from the computer aided design system, and displaying the second object design on the output device. The method further includes receiving a third input corresponding to a selection of at least one of the values associated with one of the object designs, and displaying on the output device the combination of the first and second object designs in accordance with the selected value.

Another form of the present invention includes an apparatus for network facilitated designs using a computer aided design system. The apparatus includes a computer aided design system independent interface coupled to the computer aided design system. The apparatus further includes an administration interface for selecting multiple drawings and associated properties from the computer aided design system through the independent interface in response to selections by a user over the network and for responding to user inputs received over the network to select properties of the objects represented by the drawings to achieve compatibility between multiple objects, so that the objects will correspond to related objects which cooperatively work together.

Further objects, features, advantages, and aspects of the present invention shall become apparent from the detailed drawings and descriptions contained herein.

BRIEF DESCRIPTION OF THE DRAWINGS

FIG. 16 shows a modified client display screen for the system of FIG. 1.

DESCRIPTION OF SELECTED EMBODIMENTS

Figure 1:
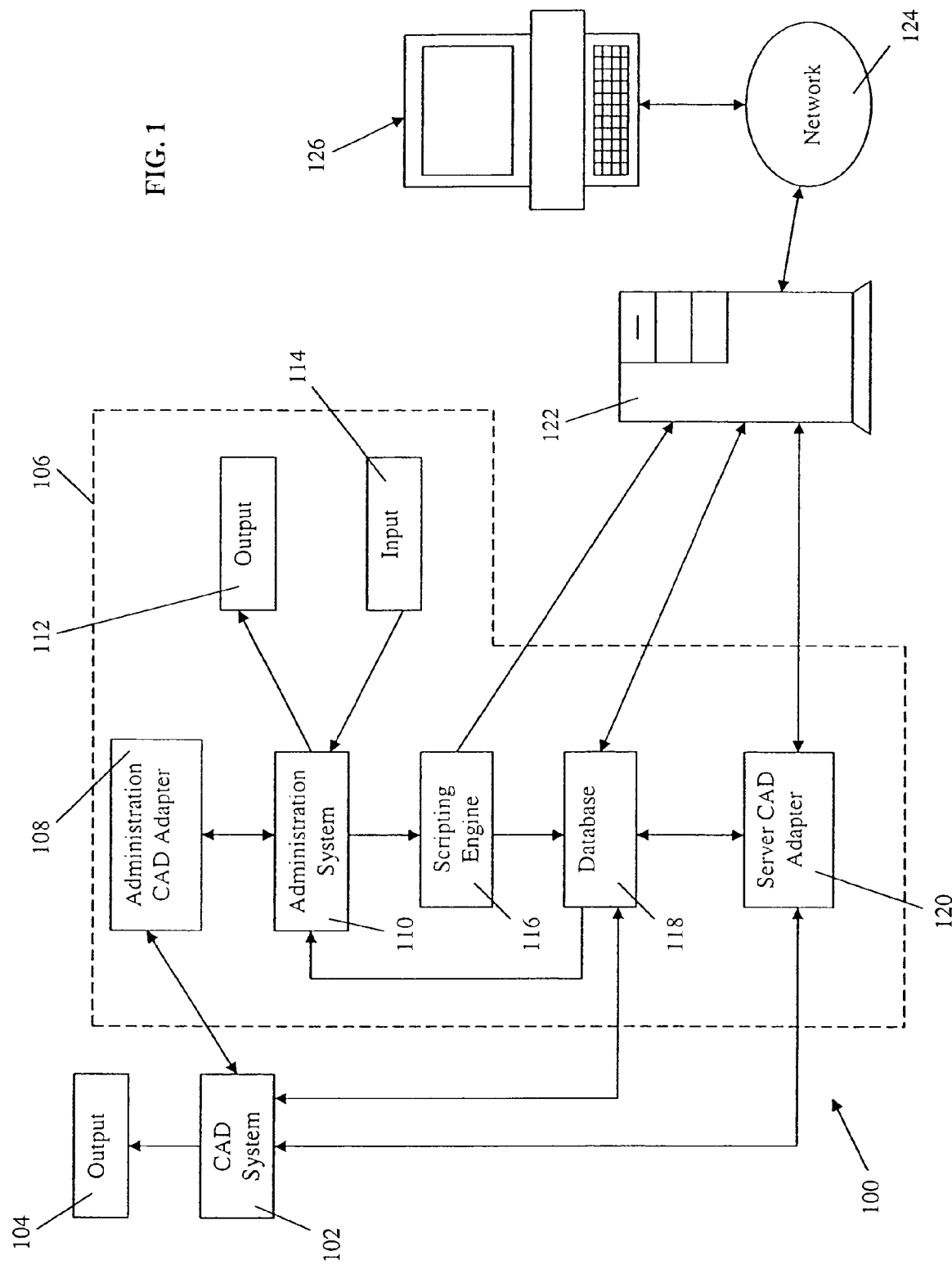
FIG. 1 is a diagrammatic view of a design system incorporating one form of applicant's invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

FIG. 1 depicts design system 100 in a diagrammatic form. It is contemplated that the system 100 can be used internally within an organization (company) or can be externally accessed by customers within or external to a company network. For example, the system 100 can be used by customers over the internet for placing orders for products designed by the customer. System 100 includes a CAD system 102. The CAD system 102 can be a single computer running a CAD program, multiple networked CAD terminals, multiple networked computers running multiple CAD programs, and/or other types of CAD systems generally known to those skilled in the art. The CAD system 102 can have an output 104. The output 104 can be a computer display, a printer, a plotter, a computer numerical control (CNC) machine, a computer data storage system, images or representations, and/or other types of output devices generally known to those skilled in the art. CAD system is operatively connected to a design system 106. The design system 106 includes an administration CAD adapter 108, an administration system 110, a scripting engine 116, a database 118, and a CAD server adapter 120. These subsystems of can be programmed using JAVA, C++, Structured Query Language (SQL), Visual Basic, Tool Command Language Took Kit (Tcl/Tk), any combination of these and/or other computer languages generally known to those skilled in the art. In one embodiment, Tcl/Tk is used due to its speed and ease of portability.

The administration system 110 communicates with the CAD system 102 through the administration CAD adapter 108. The CAD adapter 108 translates the information transferred between both systems 102, 110. For example, the CAD adapter 108 can translate the part properties of a part file (drawing) saved on the CAD system 102 so that the part can be used on the administration system 110. If a different CAD system which uses a different CAD program is installed, the CAD adapter 108 can be replaced with another CAD adapter 108 that can communicate with the new CAD program. This universality of the CAD adapter 108 allows the design system 106 to be used across different CAD platforms. Further, it is contemplated that the CAD adapter 108 can be configured to communicate with multiple CAD platforms at the same time. In one form, the CAD adapter 108 only communicates with a single CAD system 102. The administration system 110 gives a design administrator the ability to create relationships between selected CAD objects (part drawings) from the CAD system 102 and the ability to design a configuration (assembly instruction) tree for the creation design assemblies. The administration system 110 includes an output 112 for displaying information and an input 114 for receiving information from the administrator. The output 112 can include a computer monitor, a printer, and other types of output devices generally known by those skilled in the art. The input 114 can include a computer keyboard, a mouse, and other types of input devices generally known by those skilled in the art. In one form, the input 114 is a mouse and a keyboard, and the output 112 is a computer monitor.

After the administrator creates a desired product instruction relationships for the objects, a file or data stream containing the configuration information is sent to the scripting engine 116. The scripting engine 116 uses the configuration information to create two files. One file is a product configuration web page that is stored on the server 122. The product configuration web page (form) is displayed on the client 126 during the designing phase. The CAD object configuration form contains a list of questions that are used to configure a product design. The product configuration form can contain hypertext markup language (HTML), remote scripting objects, JAVA script, JAVA applets/applications, and Active-X objects or routines, for examples. It is also contemplated that other client programs generally known by those skilled in the art can be used to display information to the client 126. The other file created by the scripting engine 116 is stored in the database 118. The database 118 can include a relational database such as ACCESS or SQL-Server (Microsoft Corporation, Redmond, Wash.). It is also contemplated that the information could be stored in other manners generally known to those skilled in the art besides using a relational database. The database 118 contains all of the information required for the assembly of CAD objects. Further, the database 118 includes the file location of the product configuration form created by scripting engine 116. However, the database 118 does not have to store the CAD object properties. The CAD object properties can be centrally stored within the CAD system 102 or elsewhere on the network, and the database 118 can retrieve the CAD object properties from the CAD system 102 or elsewhere on the network. This structure keeps the information within the system 106 constantly up to date. The database 118 communicates with the CAD system 102 through the server CAD adapter 120. It is contemplated that the server CAD adapter 120 can be integrated into the database 118. In one form, however, the server CAD adapter 120 is not integrated into the database 118 so that the adapter 120 can be easily replaced or modified for use with different CAD programs. It is also contemplated that the administration CAD adapter 108 and the server CAD adapter 120 can be integrated into a single CAD adapter. The administration system 110 can retrieve configurations saved on the database 118. In one embodiment, the CAD system 102 can also retrieve information directly from the database 118 or can indirectly retrieve information through the server CAD adapter 120.

The server 122 can be a network server as generally known by those skilled in the art. In one form, the server 122 is a web server. The CAD system 102, design system 106, and server 122 can run on a single computer or on separate computers. In one form, the CAD system 102, design system 106, and server 122 run on separate computers in order to optimize processing speed. Client 126 is operatively connected to computer network 124. The client 126 can include a personal computer, a computer terminal, a personal digital assistant (PDA), and/or other types of devices generally known to those skilled in the art. The client 126 has software that allows the client to transmit and receive information from the network 124. The software on the client 126 can include a web browser and other types of client software generally known to those skilled in the art. In one embodiment, the client 126 is a personal computer that has a web browser. Web browsers are widely available and do not require the customer to load additional software in order to obtain the benefits of the present invention. The network 124 can include the internet or other Wide Area Networks (WANs), a local area network (LAN), a proprietary network such as provided by America OnLine, Inc., a combination of these, and/or other types of networks generally known to those skilled in the art.

The server 122 has a default web page that is active with respect to database 118. The default web page can be created by using common gateway interface (CGI) executables, active server pages (ASP), and in other manners generally known to those skilled in the art. Since the default web page is generated using the database 118, the default web page is always up to date. When the client 126 accesses the server 122, the default web page is shown. The default web page can contain the name of the different product configurations along with links to respective product configuration forms. The product configuration form can also actively communicate with the database 118. When a field on the product configuration form is modified, the other fields on the form are changed to reflect the permitted design configurations. Once the designer completes product configuration form, the completed form is sent to the server CAD adapter 120. The server CAD adapter 120 retrieves the object configuration instructions from the database 118, and communicates the requirements for the product design to the CAD system 102. The CAD system 102 in accordance with the instructions can generate CAD objects, object assemblies or other deliverables that are generally known to those skilled in the art. The generated CAD product can be displayed as a drawing or a three-dimensional model on the display of the client 126. The generated CAD product can also be saved to a file, used to generate a part order, printed out, used by a CNC machine to create the assembly, and in other manners generally known to those skilled in the art.

Figure 2:
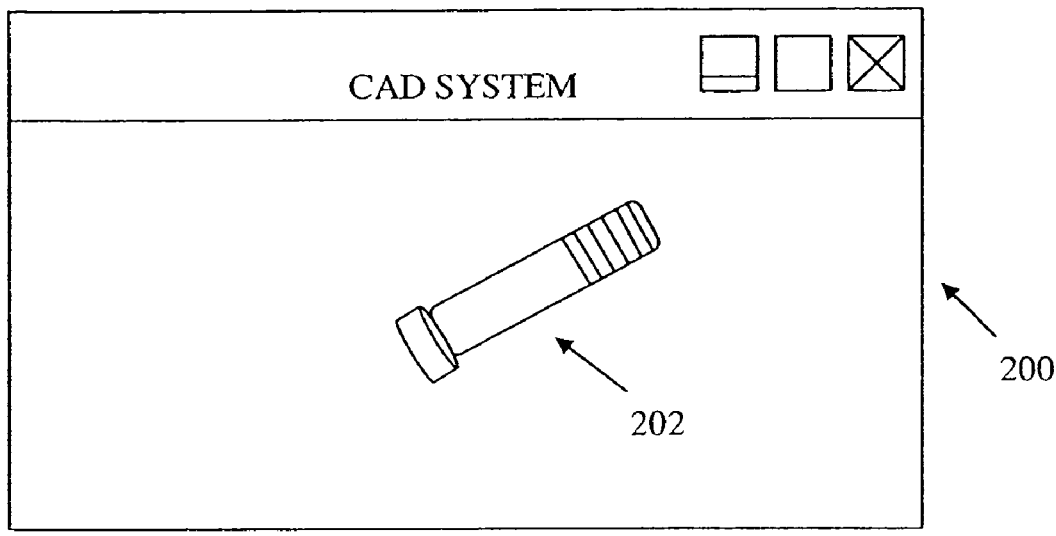
FIG. 2 shows a view of a CAD system display screen for the system of FIG. 1.

Examples of display screens according to the present invention will now be described above. The present invention is not intended to be limited to the screens described below and shown in the drawings. Other types of screens/interfaces generally known to those skilled in the art are also contemplated to be incorporated into the present invention. FIG. 2 shows a CAD system display screen 200 that is used for the generation of a CAD object 202 (object design) in the CAD system. The term "CAD object" is not intended to be limiting and includes anything that can be generated by using a CAD program. It is contemplated that the present invention is only limited to CAD systems, but can also be used with other types of systems generally known by those skilled in the relevant art such as material requirements planning (MRP) systems and application services/server development for internet or network applications. The CAD object 202 can include properties such as height, length, width, surfaces, material compositions, tolerances, parameters, and other properties generally known to those skilled in the art. Parameters can include alternate configurations of the CAD object. For example, a CAD object for a bolt can have a parameter such as head type.

Figure 3:
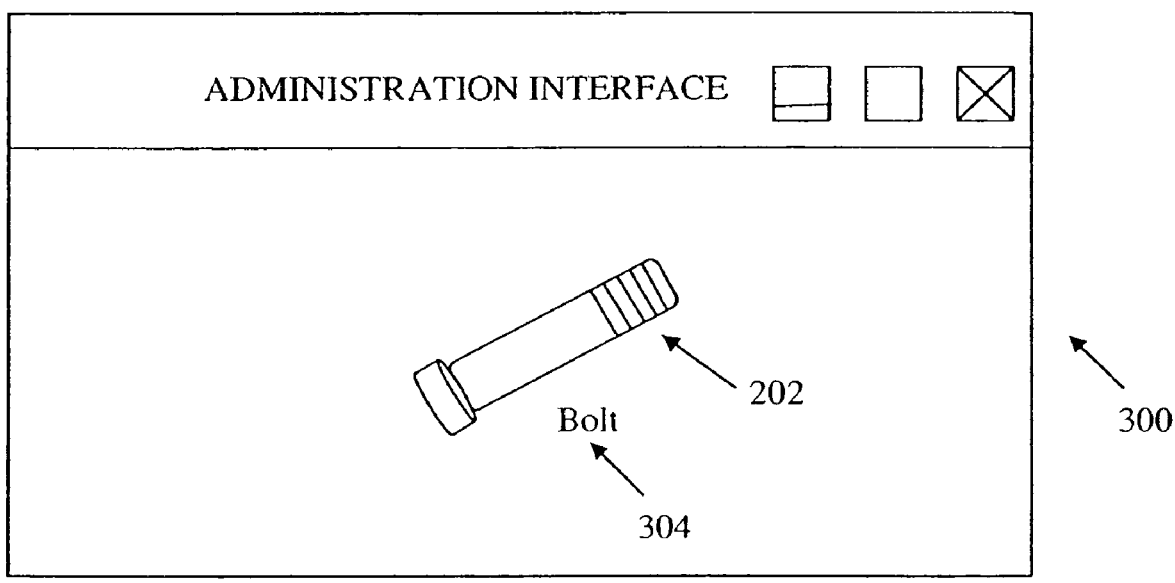
FIG. 3 shows an administration interface display screen for the system of FIG. 1.
Figure 4:
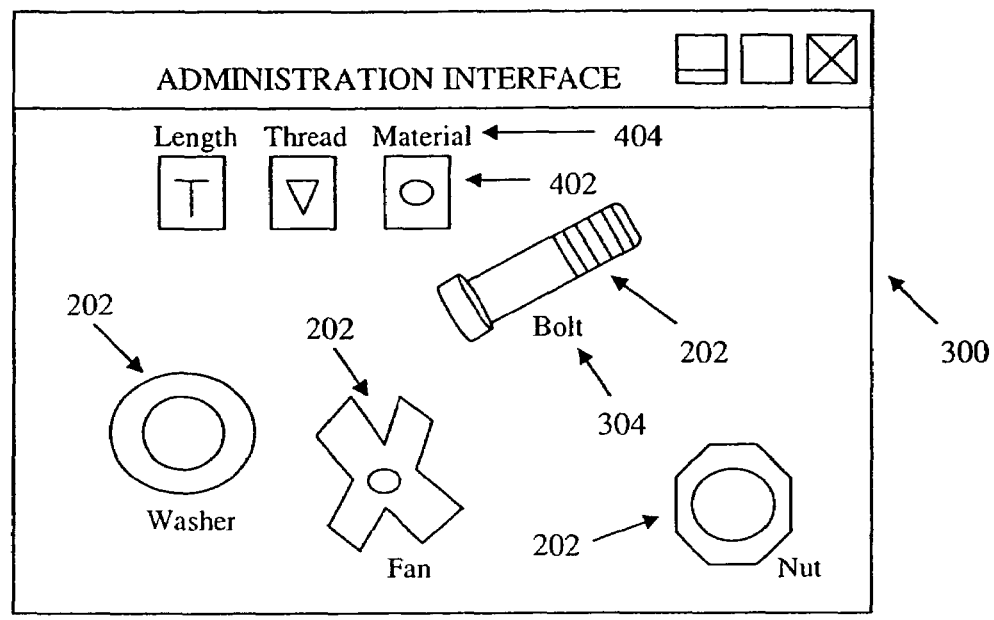
FIG. 4 shows an administration interface display screen with multiple objects for the system of FIG. 1.

FIG. 3 shows an administration interface 300 displayed on the output 112 of the administration system 110. The administrator using the administration system 110 can load CAD objects 202 from the CAD system 102. The administration CAD adapter 108 retrieves the properties of the CAD object 202 from the files of the CAD system 102, and translates the properties to a standard format that can be used by the administration system 110. If the CAD system 102 is operating, an icon showing the CAD object 202 can be generated based on the last saved property values of the object 202. If the system 102 is not operating, then a generic icon representing the CAD object 202 is generated in the administration interface 300. The administration interface 300 can also have a dynamic iconic representation of the CAD objects 202. The CAD object 202 can include a name 304. As shown in FIG. 4, multiple CAD objects 202 can be displayed on the interface 300. In addition, web objects 402 having names 404 can be created in the interface 300. The web objects 402 can be used to ask the designer questions about the design specifications. In addition web objects 402 can be used to ask other questions such as the name of the designer, purchase order number, and other questions which are not directly related to the design process. Further, the web objects can be used to give information to the designer.

Figure 5:
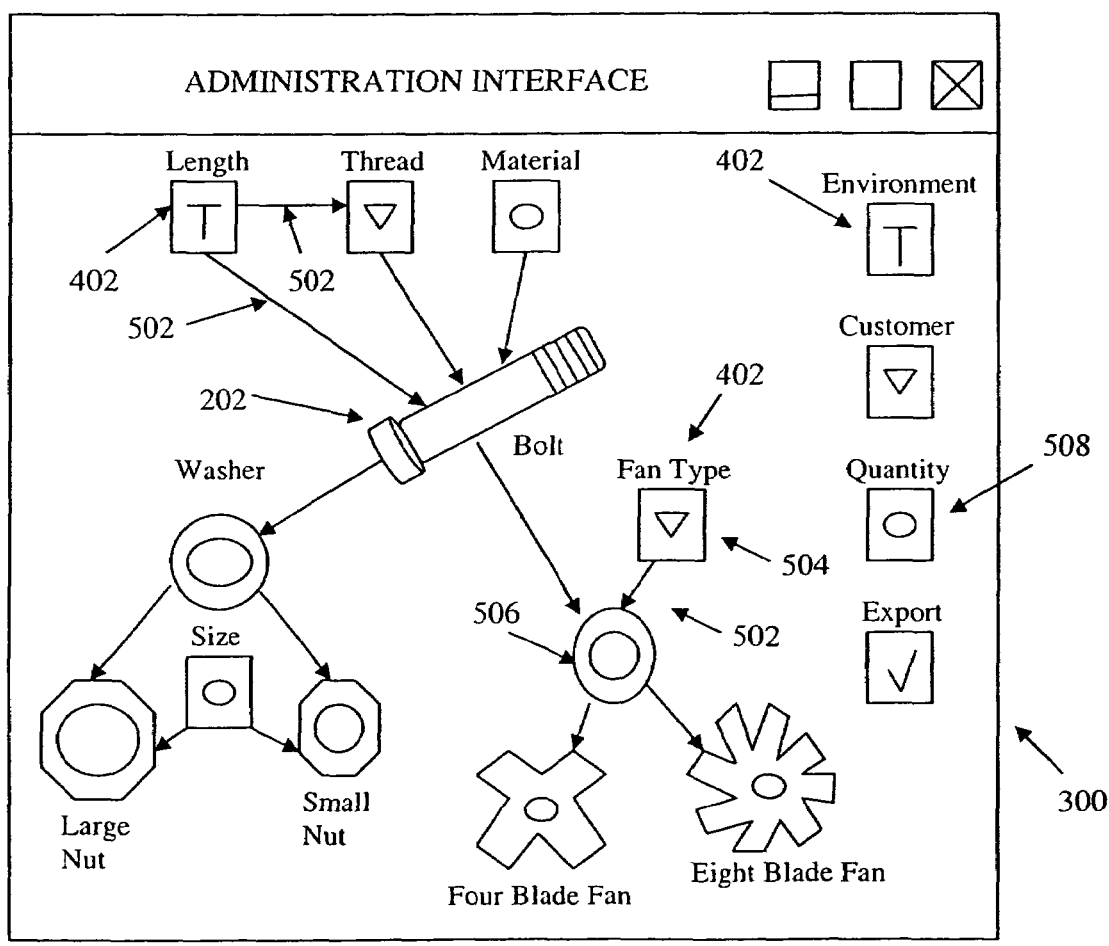
FIG. 5 shows an administration interface display screen with linked objects for the system of FIG. 1.

FIG. 5 shows a configured administrative interface 300 that has links 502 between various objects 202, 402. The links 502 are used to create conditional relationship between a parent object 504 and a child object 506. Objects that are not linked to another object are orphaned objects 508. Orphaned objects 508 can be used to display information or ask questions that are not directly related to the design process. Parent-child links 502 can be created between any combination of CAD objects 202 and web objects 402. The links 502 are used to structure the design process. For example, a link 502 can be used to set the condition that only certain diameter washers can be used with bolts having a particular diameter and that are made from a particular material.

Figure 6:
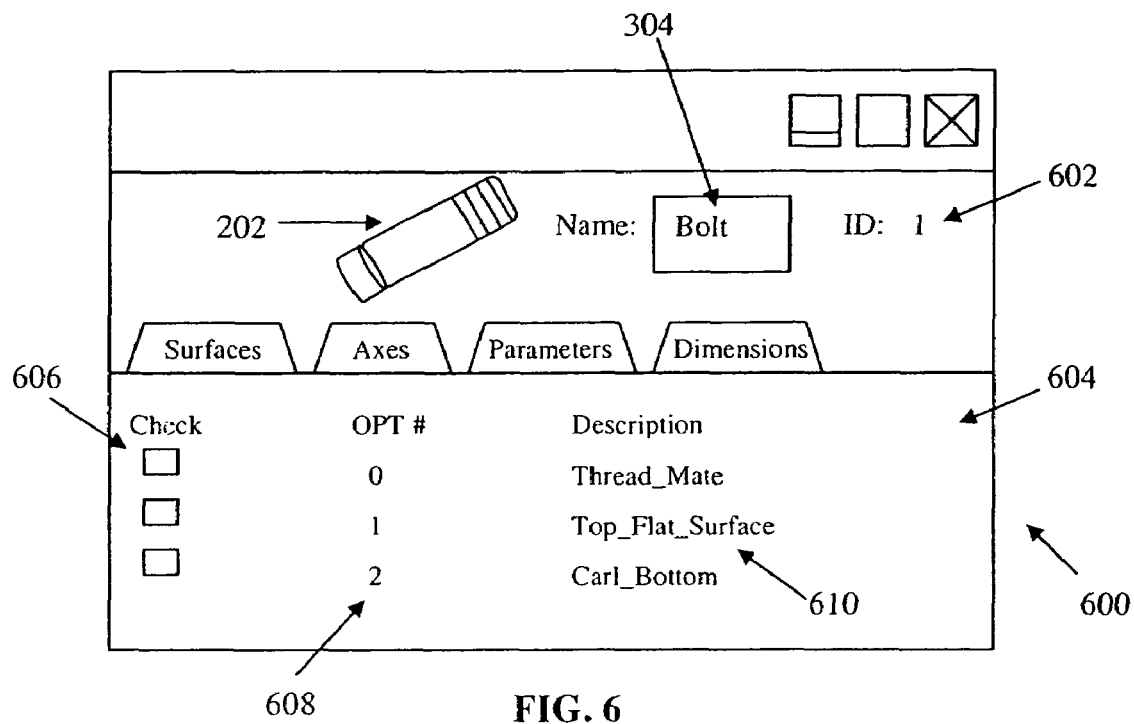
FIG. 6 shows an object properties display screen of a CAD object for the system of FIG. 1.

Each object 202, 402 displayed in the administration interface 300 has a set of properties. FIG. 6 shows a CAD object properties display screen 600 that shows the properties for a particular CAD object 202. The properties screen 600 can include an icon representing the CAD object 202, the name 304, a unique object ID) number 602, an object properties area 604, check boxes 606, options 608, and descriptions 610. The unique object ID number 602 is used to distinguish individual objects 202, 402, from one another in the administration system 110. In one embodiment, the ID number 602 is not displayed on the screen 600. The object properties area 604 displays the various properties of the CAD object 202 such as surfaces, axes, parameters, and dimensions. The check boxes 606 are used for the selection of particular property options 608. It is contemplated that other manners generally known to those skilled in the art can be used to select the options 608. The description field 610 is used to describe a particular option 608.

Figure 7:
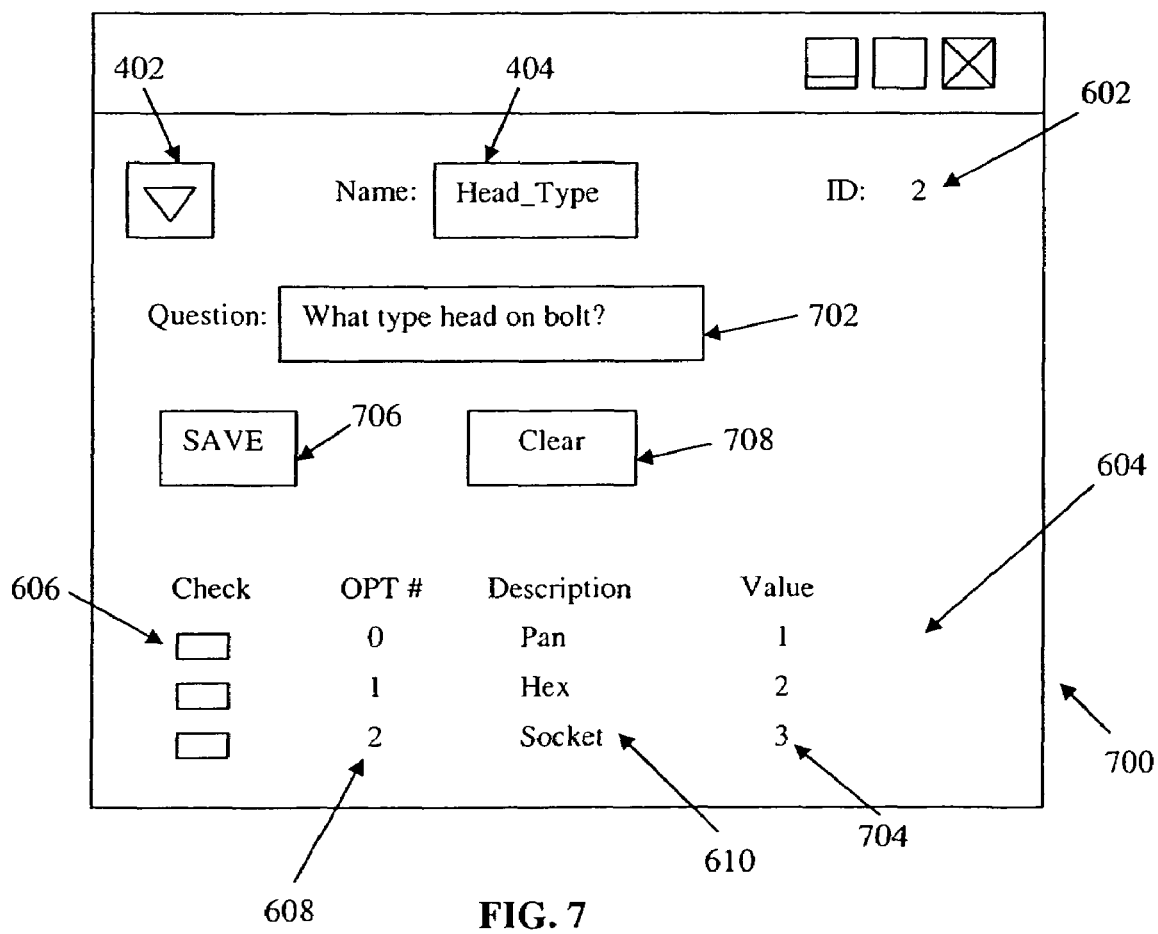
FIG. 7 shows an object properties display screen of a web object for the system of FIG. 1.

FIG. 7 shows a web object properties display screen 700 that shows the properties for a particular web object 402. The web object properties display screen 700 display is similar to the CAD object properties display screen 600. The screen 700 further includes a question/information field 702. This field 702 is displayed on the product configuration form so that the designer can be asked questions and given information. The options 608 in the property area include value fields 704. The value field 704 is the value returned when the end user selects an option 608 on the product configuration form when the question 702 is answered. For example, if the designer selects "Hex" in response to the question "What type of head on bolt?" the value "2" will be returned. A save button 706 is used to save the properties of the web object 402, and a clear button 708 is used to clear the form 700.

Figure 8:
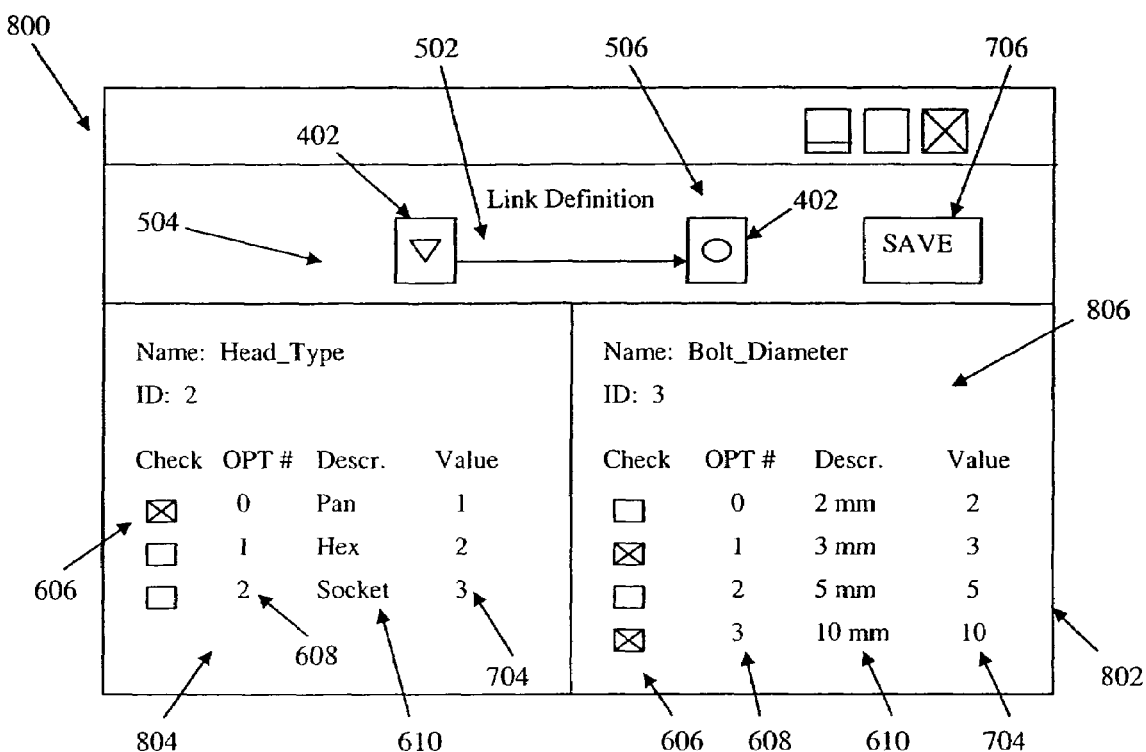
FIG. 8 shows a link definition display screen for two web objects for the system of FIG. 1.

FIG. 8 shows a link definition display screen 800. The link screen 800 is used to create links 502 that set conditional relationships between objects 202, 402. In the link screen 800 of FIG. 8, a link 502 is defined between a parent 504 web object 402 and a child 506 web object 402. The link screen 800 has a link definition area 802 that includes a parent properties area 804 and a child properties area 806. The check boxes 606 are used to select the relationship of properties between the parent 504 and the child 506. For example, if the designer selects the "Pan" option 608 in response to the question "What type of head on bolt?" then the answer to "Bolt_Diameter" question will only display the "3 mm" and the "10 mm" options.

Figure 9:
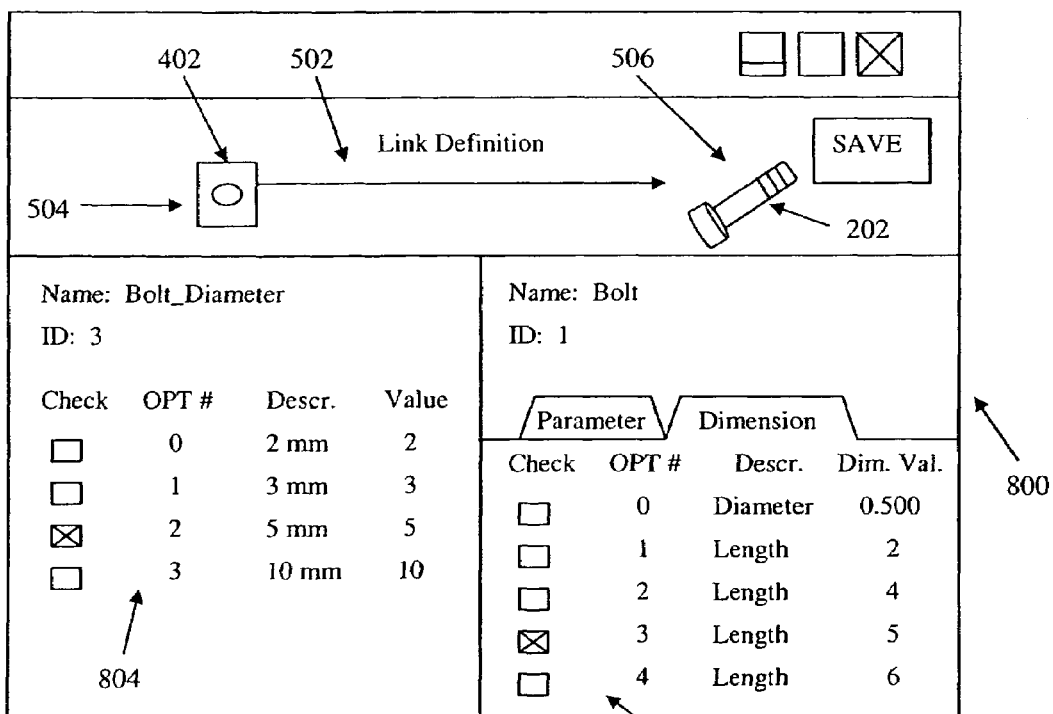
FIG. 9 shows a first link definition display screen for a web object and a CAD object for the system of FIG. 1.
Figure 10:
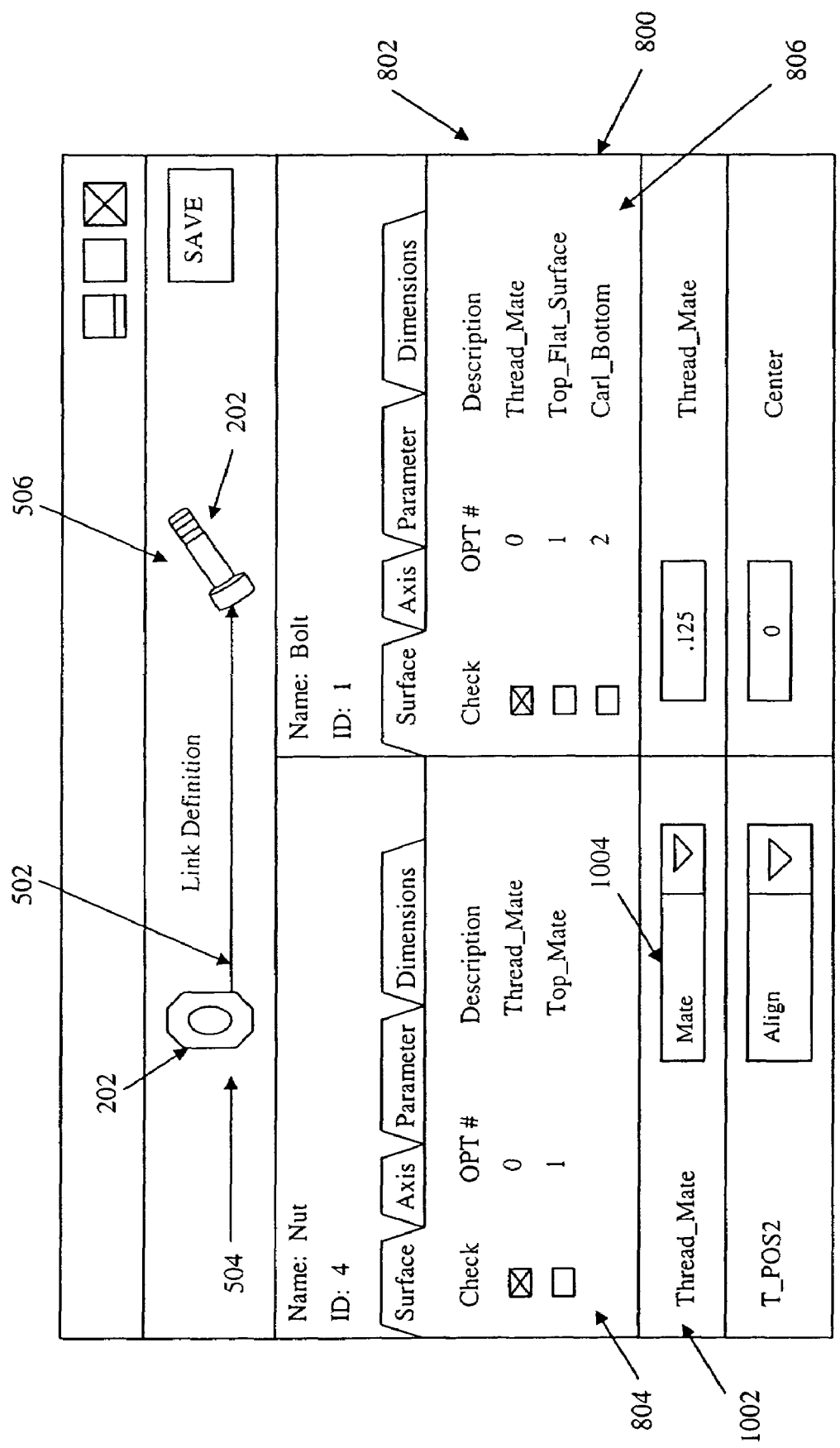
FIG. 10 shows a link definition display screen for two CAD objects for the system of FIG. 1.
Figure 11:
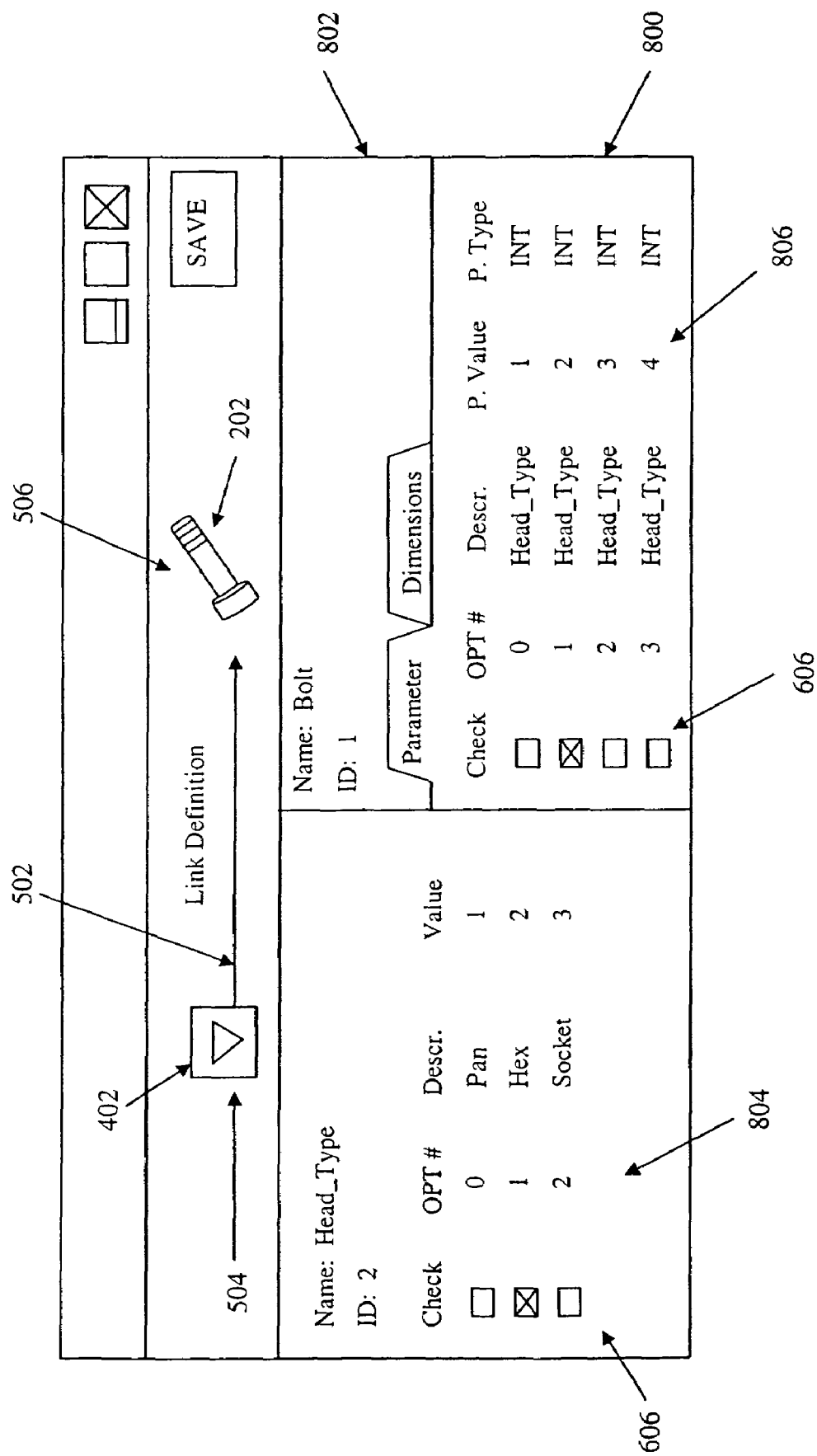
FIG. 11 shows a second link definition display screen for a web object and a CAD object for the system of FIG. 1.

FIG. 9 shows the link screen 800 for a parent 504 web object 402 and a child 506 CAD object 202. The link 502 shown in FIG. 9 establishes the condition that if the answer to the "Bolt_Diameter" question is "5 mm" then only a bolt having the length of "5' can be used in the particular design. FIG. 10 shows the link screen 800 for a parent 504 CAD object 202 and a child 506 CAD object 202. The link 502 defined in the screen 800 instructs the design system 106 how the objects 202 are assembled. The link screen 800 further includes assembly fields 1002 that include assembly instruction fields 1004. The assembly instruction fields 1004 define how the CAD objects 202 are assembled together to geometrically constrained together. For example, in the screen 800 shown in FIG. 10, the "Thread_Mate" surface of the "Nut" is mated to the "Thread_Mate" surface of the "Bolt". The link screen 800 of FIG. 11 shows the link 502 between a web object 402 and a CAD object 202 in which the answer to a question 702 for the web object 402 controls the parameters of the CAD object 202. Parameters can include properties such as part types, materials, costs, and other properties generally known to those skilled in the art.

Figure 12:
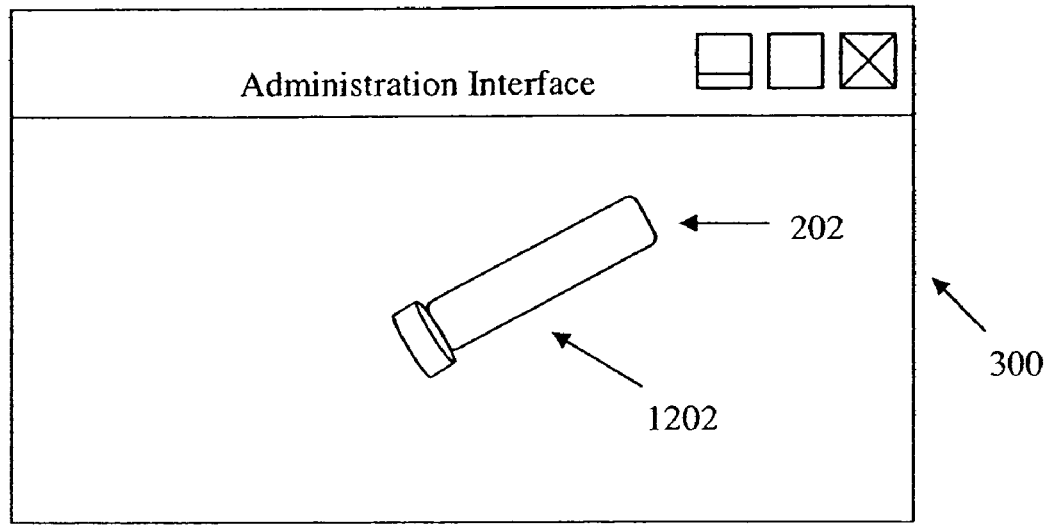
FIG. 12 shows an administration interface display screen of an unmodified CAD object for the system of FIG. 1.
Figure 13:
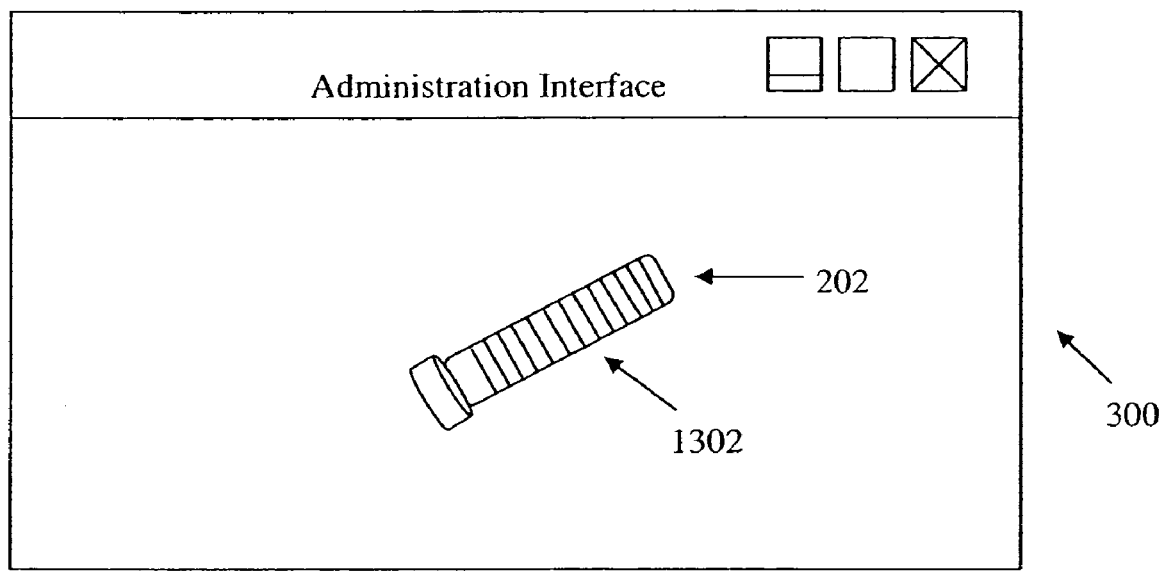
FIG. 13 shows an administration interface display screen of a modified CAD object from FIG. 12.

Another embodiment of the present invention is shown in FIGS. 12–13. As shown in FIG. 12, when a CAD object 202 is initially loaded into the administration system 110, an unmodified object icon 1202, which corresponds to the last saved values for the object 202, is displayed on the administration interface screen 300. If the properties of the CAD object 202 are modified, the administration system 110 can automatically command the CAD system 102 to generate a modified object icon 1302.

Figure 14:
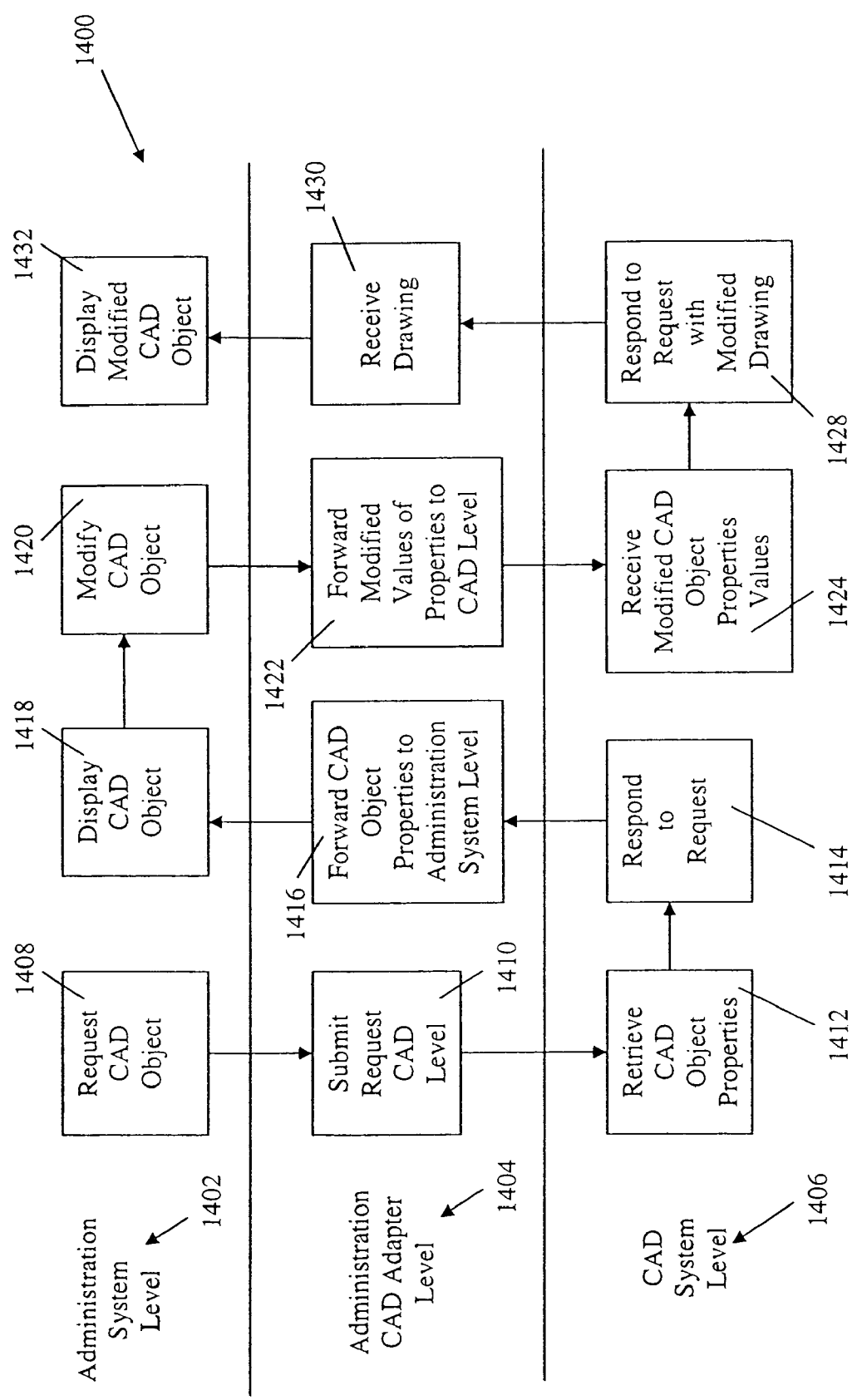
FIG. 14 is a flow diagram illustrating one process for displaying modified CAD objects.

Referring now to FIG. 14, one process 1400 for generating the modified object icon 1302 with system 100 is shown. The administration system level 1402 corresponds to the administration system 110. The administration CAD adapter level 1404 corresponds to the administration CAD adapter 108, and the CAD system level 1406 corresponds to the CAD system 102. As discussed above, the systems 102, 108, and 110 can be formed over a single level or multiple combinations of levels. In stage 1408, the administration system level 1402 initially places a request for a CAD object 202. The CAD adapter level 1404 processes the request in stage 1410 and submits the request to the CAD system level 1406. In stage 1412, the CAD system level 1406 retrieves the properties of the request CAD object 202, generates the unmodified object icon 1202, and responds to the request in stage 1414. The CAD adapter level 1404 in stage 1416 translates the properties and forwards the properties and the unmodified object icon 1202 to the administration system level. The administration system level 1402 in stage 1418 displays the unmodified object icon 1202. The administrator modifies the properties of the CAD object in stage 1420, and the administration system level 1402 sends a new icon request along with the properties to the CAD adapter level 1404. The CAD adapter level 1404 in stage 1422 instructs the CAD system level 1406 to generate a new modified icon 1302. In stage 1424, the CAD system level 1406 receives the instructions and generates the modified icon 1302 (drawing), and the CAD system level 1406 in stage 1428 responds to the CAD adapter level 1404. The CAD adapter level 1404 in stage 1430 receives the modified icon 1302, and in stage 1432, the administration system level 1402 displays the modified CAD object 1302.

As discussed above with reference to FIG. 1, after all of the configuration links are defined between the objects 202, 402, the administration system 110 sends a file or data stream containing the configuration information to the scripting engine 116. The configuration information can be structured in the form of relational database tables, a text file, and in other manners known to those skilled in the art. The scripting engine 116 generates two files from this information. The first file, which is stored on the server 122, corresponds to the product configuration form which is used by the designer during the design phase. The second file is stored in the database 118 and includes the complete assembly instructions and configuration information. It is contemplated that singular file, multiple file or direct database access can also be used.

Figure 15:
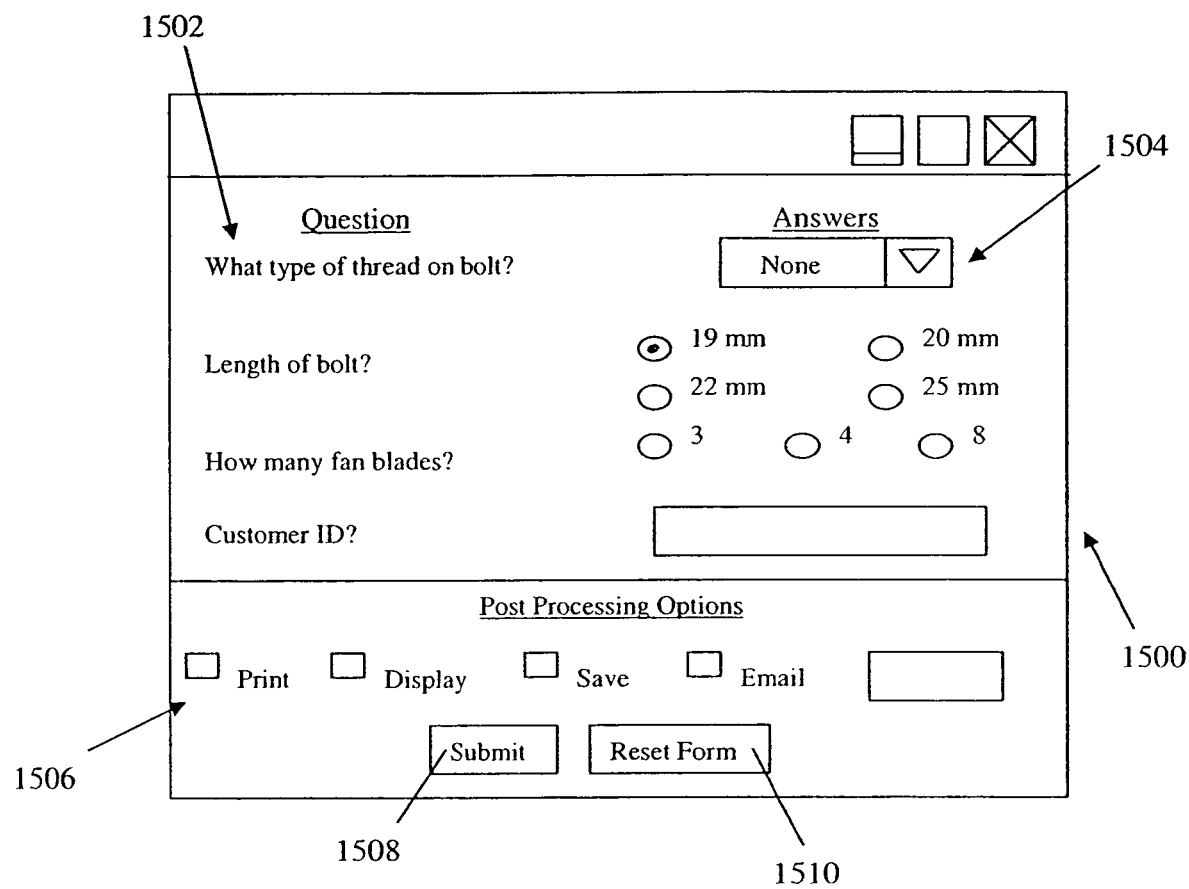
FIG. 15 shows a client display screen for the system of FIG. 1.

When an end user first accesses the design system 106, the default web page from server 122 will appear that lists the available product configuration designs and contains links to the respective product configuration forms. FIG. 15 shows one example of a product configuration from 1500 (independent interface). The configuration form 1500 includes questions 1502 and answer fields 1504. Each question 1502 corresponds to the question field 702 of a corresponding web object 402. Likewise, the options of the answer fields 1504 correspond to the description fields 610 of the web object 402. The configuration from 1500 includes output type options 1506 in which the designer can select the desired output for a submitted design. The output type options 1506 can correspond to an orphaned object 508 within the administration system 110. Further, the questions 1502 can include additional questions not specifically related to the design process such as the name of the customer, delivery constraints, and other types of questions depending on the application. The configuration form 1500 can include a submit button 1508 for submitting the completed form 1500 to the server 122 and a reset form button 1510 for resetting the form 1500.

As discussed above, conditional links 502 can be created between web objects 402 that will control the available options 608 for a particular answer 1504. When one answer 1504 on the configuration form 1500 is modified, the questions 1502 will change. For example, as shown in FIGS. 15–16, answer 1604 is modified. This modification to the answer 1604 changes the remaining questions 1502 and answers 1504. The configuration form 1500 provides a simple yet powerful interface for configuring designs. This form modification feature can be internally executed within the client 126 to improve speed. In another embodiment, the configuration form 1500 actively connects to the database 118 to directly receive the required modifications to the form 1500.

Figure 17:
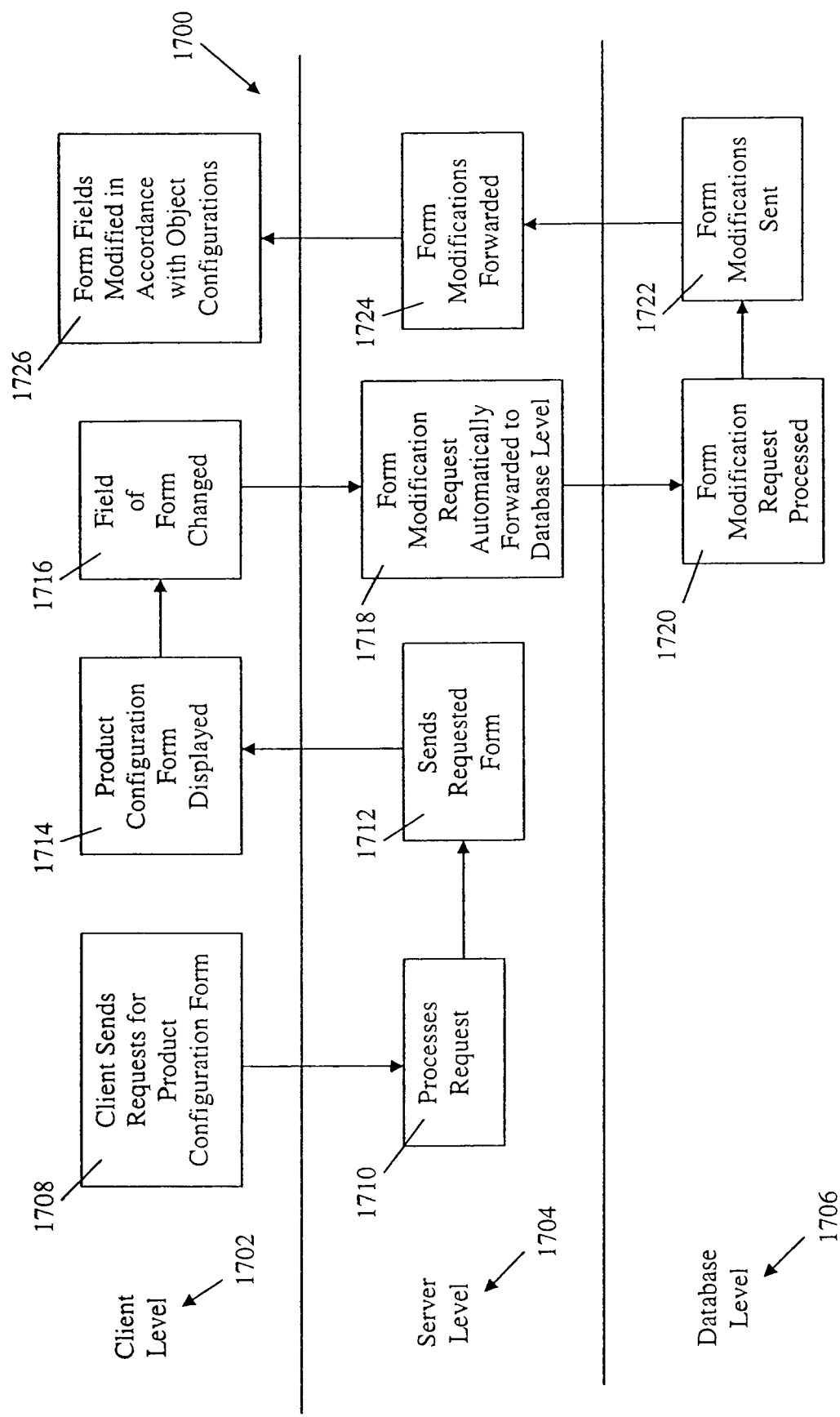
FIG. 17 is a flow diagram illustrating one process for modifying a client display screen.

Referring now to FIG. 17, one process 1700 for modifying the configuration form 1500 with system 100 is shown. The client level 1702 corresponds to client 126. Server level 1704 corresponds to the server 122, and the database level 1706 corresponds to the database 118. In stage 1708, the client level 1702 sends the server level 1704 a request for a product configuration form 1500. The server level 1704 in stage 1710 processes the request and in stage 1712 sends the requested form 1500. In stage 1714, the client level 1702 displays the form 1500. An answer field 1604 in the form 1500 is changed and a request for a modified form is sent in stage 1716. In stage 1718, the server level 1704 automatically forwards the form to the database level 1706. In stage 1720, the form modification request is processed in the database level 1706, and the modified form is sent in stage 1722. The server level 1704 in stage 1724 forwards the form modifications to the client level 1702. In stage 1726, the client level displays the form with the questions 1502 and answers 1504 modified in accordance with the linked object configuration conditions.

Figure 18:
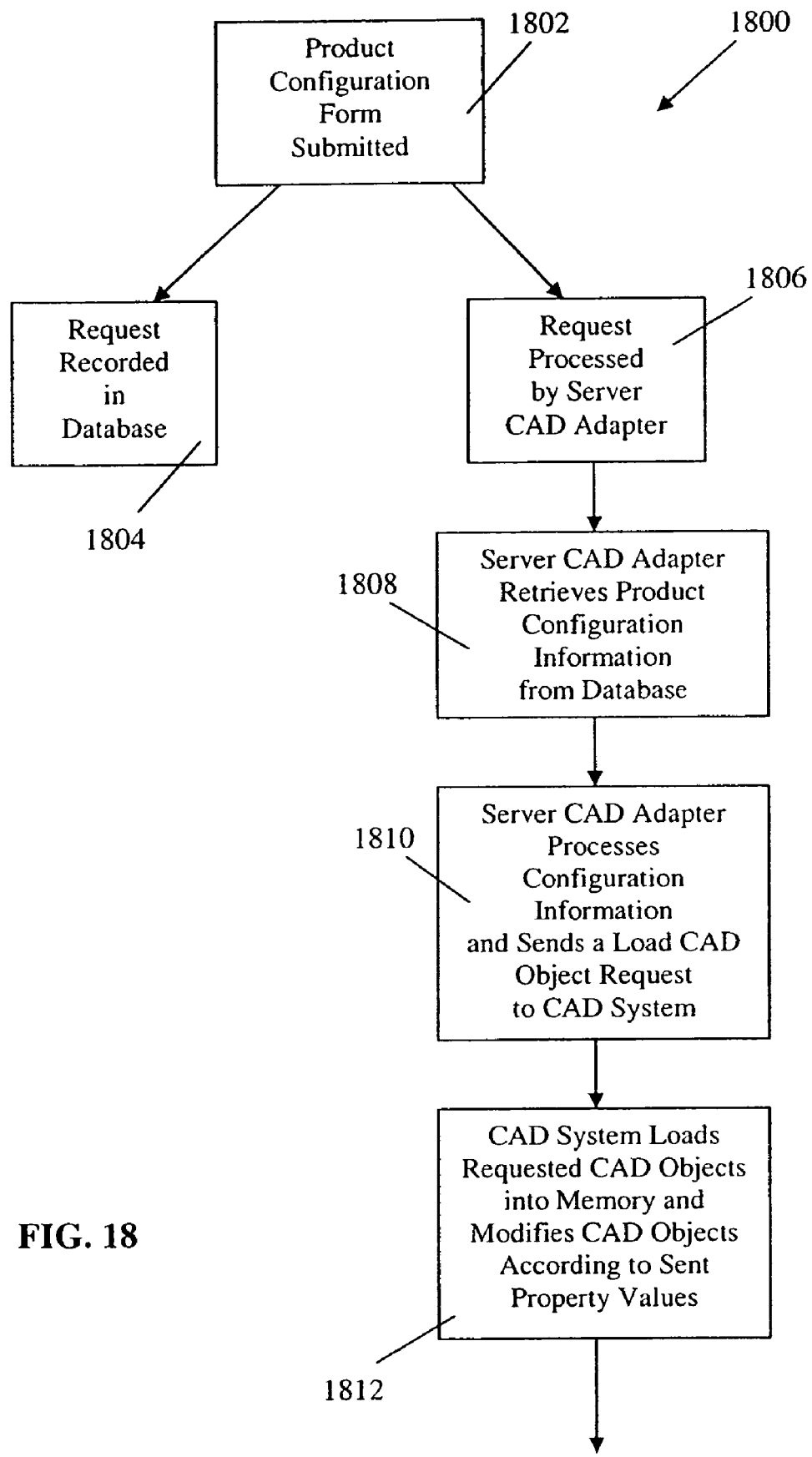
FIGS. 18–19 show a flow diagram illustrating one process for generating an assembled CAD object design.
Figure 19:
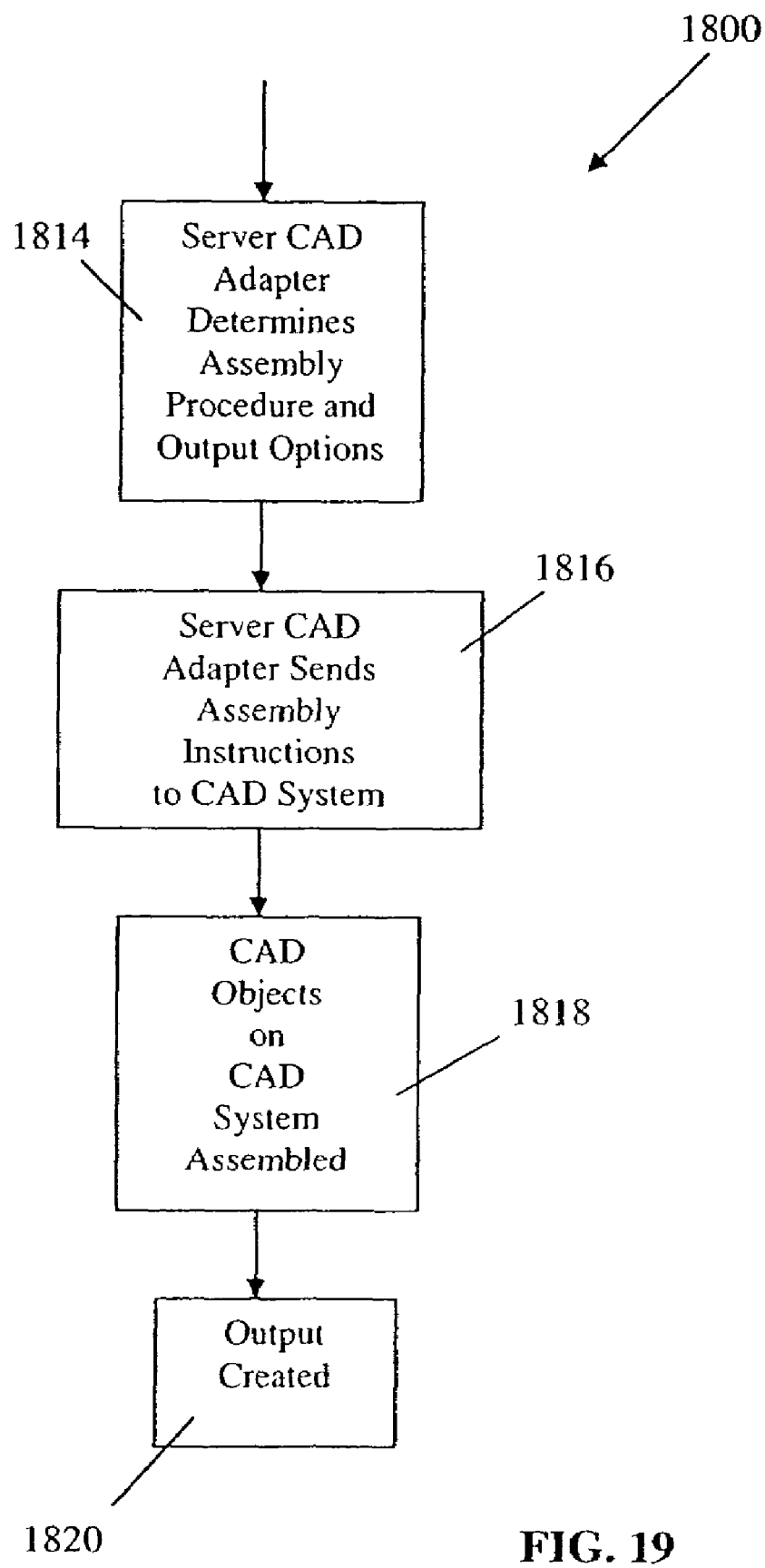

When the product configuration form 1500 is submitted by the end user, in this preferred embodiment, the server CAD adapter 120 instructs the CAD system 102 how to complete the product design and the CAD system 102 generates the product design and the desired output. The output from the CAD system 102 can include a drawing of the product design, which is displayed on the client 126. Referring now to FIGS. 18–19, one process 1800 for generating an assembled object with system 100 is shown. In stage 1802, a completed product configuration form 1500 is submitted to the server 122. In stage 1804, a copy of this request can optionally be stored in the database 118 for later retrieval. The server CAD adapter 120 in stage 1806 processes the request, and in stage 1808 retrieves the stored product configuration information from the database 118. In stage 1810, the server CAD adapter 120 processes the information and commands the CAD system 102 to load the CAD objects 202 of the design into memory. Further, the CAD adapter sends the property values for the individual CAD objects. The CAD system 102 in stage 1812 loads the requested CAD objects 202 into memory and modifies their properties. It is also contemplated that the CAD system 102 can be instructed to load and modify a single CAD object 202. Stages 1814, 1816 and 1818 are optional. In stage 1814, the server CAD adapter 120 determines the assembly procedure for the CAD objects 202 and determines the desired output from the output type fields 1506 from the configuration form 1500. In stage 1816, the server CAD adapter 120 sends assembly and output instructions to the CAD system 102. The CAD system 102 in stage 1818 assembles the CAD objects 202, and in stage 1820 the output for the design is created. In one embodiment, the output includes sending a drawing of the design to the web browser of the client 126. It is contemplated that the system 100 can create (export) a wide variety of outputs including assembly files, assembly routine data, separate drawing views, drawing functions/routines, reports, assembly documentation, bill of materials, CNC control codes, web pages, and/or other types of outputs generally known by those skilled in the art. It is also contemplated that the output can be directed to other systems as inputs.

While a specific embodiment of the present invention has been shown and described in detail, the breadth and scope of the present invention should not be limited by the above-described exemplary embodiment, but should be defined only in accordance with the following claims an their equivalents. All changes and modifications that come within the spirit of the invention are desired to be protected.

The invention claimed is:

1. A method of implementing an administration system for use with a computer aided design (CAD) system, the method comprising:

loading a plurality of CAD objects generated using the CAD system into the administration system;

retrieving a set of object properties for each of the plurality of CAD objects from the CAD system;

translating the set of object properties for each of the plurality of CAD objects into an administration format for use by the administration system;

creating a plurality of web objects;

defining a set of object properties for each of the plurality of web objects, the set of object properties for each of the plurality of web objects pertaining to a complete CAD object or more than one CAD object;

creating a plurality of links in the administration system, each link defining a conditional relationship between a parent object having a set of object properties and a child object having a set of other properties, each parent object being one of the plurality of CAD objects and the plurality of web objects, and each child object being one of the plurality of CAD objects and the plurality of web objects;

when the parent object is a selected CAD object of the plurality of CAD objects, defining the set of object properties for the parent object to include the set of object properties for the selected CAD object translated into the administration format;

when the parent object is a selected web object of the plurality of web objects, defining the set of object properties for the parent object to include the set of object properties for the selected web object;

when the child object is a selected CAD object of the plurality of CAD objects, defining the set of object properties for the child object to include the set of object properties for the selected CAD object translated into the administration format;

when the child object is a selected web object of the plurality of web objects, defining the set of object properties for the child object to include the set of object properties for the selected web object; and defining a set of link relationships for each of the plurality of links.

2. The method of claim 1, wherein the object properties for at least one of the plurality of CAD objects include alternate configurations of the at least one of the plurality of CAD objects.

3. The method of claim 1, wherein the object properties for at least one of the plurality of web objects includes a question about a design specification and at least two answers to the question.

4. The method of claim 1, wherein the set of link relationships for at least one of the plurality of links defines a limited subset of the set of object properties for the child object that are permitted when one of the set of object properties for the parent object is selected.

5. The method of claim 1, wherein the step of defining a set of link relationships comprises the steps of:

displaying the set of object properties for the parent object;

displaying the set of object properties for the child object;

selecting a selected one of the set of object properties for the parent object;

selecting at least one of the set of object properties for the child object to be associated with the selected one of the set of object properties for the parent object.

6. The method of claim 1, wherein at least one of the plurality of links is a CAD link between a parent object that is a first one of the plurality of CAD objects and a child object that is a second one of the plurality of CAD objects, the set of link relationships for the CAD link including an assembly field that defines how the parent object and the child object are assembled together.

7. The method of claim 1, further including the step of displaying the plurality of links in relational database tables.

8. The method of claim 1, further comprising the step of creating a plurality of product configuration forms based on the plurality of links.

9. The method of claim 8, wherein the object properties for at least one of the plurality of web objects includes a question about a design specification, a first answer to the question and a second answer to the question.

10. The method of claim 9, further comprising the steps of creating a first form of the plurality of product configuration forms based on selection of the first answer to the question; and creating a second form of the plurality of product configuration forms based on selection of the second answer to the question, the second form being different from the first form.

11. A method of implementing an administration system for use with a computer aided design (CAD) system, the method comprising:

loading a plurality of CAD objects generated using the CAD system;

defining a set of object properties for each of the plurality of CAD objects;

defining a plurality of web objects;

defining a set of object properties for each of the plurality of web objects;

creating a plurality of links, each link defining a conditional relationship between a parent object and a child object, each parent object being one of the plurality of CAD objects and the plurality of web objects, and each child object being one of the plurality of CAD objects and the plurality of web objects;

when the parent object is a selected CAD object of the plurality of CAD objects, defining the set of object properties for the parent object to include the set of object properties for the selected CAD object translated into the administration format;

when the parent object is a selected web object of the plurality of web objects, defining the set of object properties for the parent object to include the set of object properties for the selected web object;

when the child object is a selected CAD object of the plurality of CAD objects, defining the set of object properties for the child object to include the set of object properties for the selected CAD object translated into the administration format;

when the child object is a selected web object of the plurality of web objects, defining the set of object properties for the child object to include the set of object properties for the selected web object; and defining a set of link relationships for each of the plurality of links, wherein the step of defining a set of link relationships comprises the steps of:

displaying the set of object properties for the parent object;

displaying the set of object properties for the child object;

selecting a selected one of the set of object properties for the parent object;

selecting at least one of the set of object properties for the child object to be associated with the selected one of the set of object properties for the parent object.

* * * * *